ABSTRACT

The present invention relates to a class of substituted 1-benzyl-1H-indazole-3-carboxylic acids, amides and esters having the Formula (I)

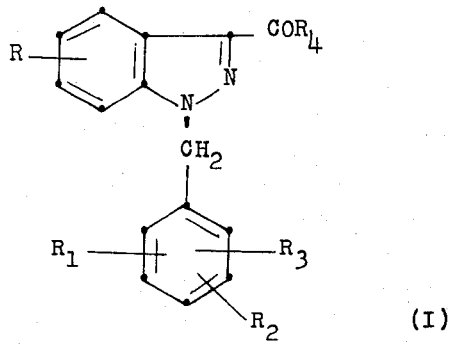

wherein
R=H, $CH_3$, $OCH_3$, halogen;
$R_1$=H, $CH_3$, halogen or a residue of condensed benzene ring;
$R_2$=halogen, $CH_3$, $OCH_3$, $CF_3$, $CONH_2$, $SO_2CH_3$;
$R_3$=H, halogen;
$R_4$=OH, $NH_2$, $OR_5$;
$R_5$ being a residue easily hydrolyzed in the animal body to yield OH, for instance $-CH_2CH_2OH$, $-CH_2CHOHCH_2OH$, $-CH-(CH_2OH)_2$, and to the pharmaceutically acceptable salts of these compounds.

These compounds are useful as pharmaceuticals.

13 Claims, No Drawings

United States Patent

Palazzo et al.

[11] 3,895,026
[45] July 15, 1975

[54] SUBSTITUTED 1-BENZYL-1H-INDAZOLE-3-CARBOXYLIC ACIDS AND DERIVATIVES THEREOF

[75] Inventors: Giuseppe Palazzo; Bruno Silvestrini, both of Rome, Italy

[73] Assignee: Aziende Chimiche Riunite Angelini Francesco A.C.R.A.F. S.p.A., Rome, Italy

[22] Filed: Feb. 9, 1973

[21] Appl. No.: 330,902

[30] Foreign Application Priority Data
Feb. 29, 1972 Italy.................................. 48628/72

[52] U.S. Cl.............................. 260/310 C; 424/274
[51] Int. Cl............................................. C07d 49/02
[58] Field of Search ................................ 260/310 C

[56] References Cited
UNITED STATES PATENTS
3,007,938  11/1961  Kirchner ......................... 260/310 C
3,470,194  9/1969  Palazzo ........................... 260/310 C
3,567,721  3/1971  Wajngurt ........................ 260/310 C

*Primary Examiner*—John D. Randolph
*Attorney, Agent, or Firm*—Ladas, Parry, Von Gehr, Goldsmith & Deschamps

SUBSTITUTED 1-BENZYL-1H-INDAZOLE-3-CARBOXYLIC ACIDS AND DERIVATIVES THEREOF

The present invention relates to a class of substituted 1-benzyl-1H-indazole-3-carboxylic acids, amides and esters having the Formula (I)

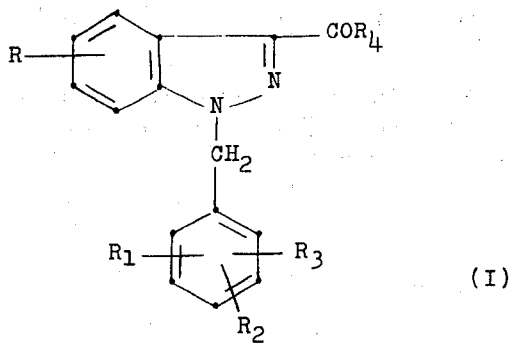

wherein
R=H, $CH_3$, $OCH_3$, halogen;
$R_1$=H, $CH_3$, halogen or a residue of condensed benzene ring;
$R_2$=halogen, $CH_3$, $OCH_3$, $CF_3$, $CONH_2$, $SO_2CH_3$;
$R_3$=H, halogen;
$R_4$=OH, $NH_2$, $OR_5$;
$R_5$ being a residue easily hydrolyzed in the animal body to yield OH, for instance $-CH_2CH_2OH$, $-CH_2CHOHCH_2OH$, $-CH-(CH_2OH)_2$, and to the pharmaceutically acceptable salts of these compounds.

In accordance with this invention there is provided a process for preparing the compounds of Formula I above, characterized by a. reacting an indazole of the formula

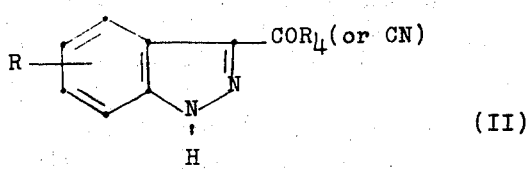

or the 4,5,6,7-tetrahydro derivative thereof and wherein R and $R_4$ are as defined above with a benzyl derivative of the formula

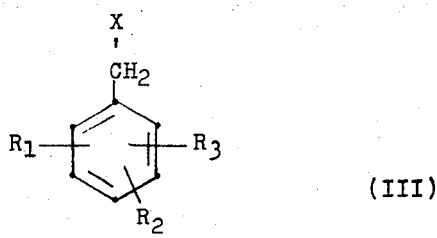

wherein $R_1$, $R_2$ and $R_3$ are as defined above and X is a halogen or a similarly reactive leaving group then doing one or more of the following when required b. when the tetrahydro derivative of Formula II is used then dehydrogenating the tetrahydro product formed, c. when the cyano group of Formula II is used hydrolyzing the product to the acid, ester or amide, d. converting any ester acid into an ester or amide, any ester into an acid or amide or any amide into an acid;

e. forming the pharmaceutically acceptable salt.

Substances having Formula I, which, in case of $R_4$=OH, can be administered also in the form of salts, formed from alkaline or alkaline earth metals, organic bases, such as diethylamine, morpholine, diisopropylamine, diethanolamine, dimethylaminoethanol, or from basic amino acids, where, for example, the group $R_5$ has a basic amino group, or where $R_4$ is $OR_5$ or $NH_2$ the acid addition salts may be formed, e.g., the hydrochloride, when these salts or (in the case of $R_4$=$OR_5$) when these esters are administered to an animal they are converted by the animal body into the corresponding acids, exhibit interesting pharmacological properties As a matter of fact, some of them administered in a single oral dose provoke a neat atrophy of the seminal line of the testes without causing other toxic effects. These suggest the use of those substances as antispermatogenics in human and veterinary medicine and presumably also in order to reduce the multiplication of harmful insects;* Some well studied examples of compounds showing such type of activity in rats are 1-o-chlorobenzyl-lH-indazole-3-carboxylic acid, 1-m-chlorobenzyl-1H-indazole-3-carboxylic acid, 1-p-chlorobenzyl-1H-indazole-3-carboxylic acid, 1-p-fluorobenzyl-1H-indazole-3-carboxylic acid, 1-p-bromobenzyl-1H-indazole-3-carboxylic acid, 1-(2,4-dichlorobenzyl)-1H-indazole-3-carboxylic acid and their glyceryl esters.

*These compounds have also a potential use in females both to inhibit ovulation and that sterility by the mechanism of subsequent rebound.

As regards the antispermatogenic character of the compounds it may be pointed out that, as a result of experiments on rats and monkeys, the product should be administered to a man orally at a daily dose range of from 0.2 to 3 grams of the active compound. These compounds exhibit excellent intestinal absorption in man.

Moreover, all the compounds of the present invention in which $R_4$=OH inhibit heat coagulation of serum proteins in vitro. The same products and those ester and amide derivatives of them which are converted into the corresponding acids in the animal body also inhibit coagulation of serum albumin in vivo. This type of biochemical activity was evidenced by Mizushima's method (in "Inflammation", Ed. B. Silvestrini S. Tura - International Congress Series N. 163, Amsterdam 1968, page 37) modified by Silvestrini Catanese and Lisciani (in "Inflammation Biochemistry and Drug Interaction", Ed. A. Bertelli and J. C. Houck, International Congress Series N. 188, Amsterdam 1969, page 282). The compounds (I) significantly stabilize bovine serum albumin at concentrations of the order of 30 μg/ml., which corresponds to the active concentration of indomethacin. Moreover, the compounds of the Formula (I) have a much lower $LD_{50}$ than indomethacin (at least five times) and do not provoke gastric ulcers at doses below 250 mg/kg p.o. Since not all of the compounds of the Formula (I) provoke the aforementioned effect on tests, also because their metabolism and pharmacokinetics are different in relation to differences in chemical structures and animal species, some of them which are free from that type of effect may be administered to humans for the purpose of treating various inflammatory and degenerative diseases. Some examples of this type of substances are 1-

(2,6-dichlorobenzyl)-1H-indazole-3-carboxylic acid, 1-(5-chloro-2-methoxy)-benzyl-1H-indazole-3-carboxylic acid, 1-p-chlorobenzyl)-5-methyl-1H-indazole-3-carboxylic acid, 1-(p-chlorobenzyl)-5-hydroxy-1H-indazole-3-carboxylic acid, 1-m-trifluoromethyl)-1H-indazole-3-carboxylic acid, 1-[1-(4-chloronaphthyl)-methyl]-1H-indazole-3-carboxylic acid and their derivatives.

According to this invention, the compounds having Formula (I), wherein $R_4$=OH, are obtained by direct reaction between the appropriate indazole-3-carboxylic acid of the Formula (II) and substituted benzyl derivatives of the Formula (III), according to the following scheme:

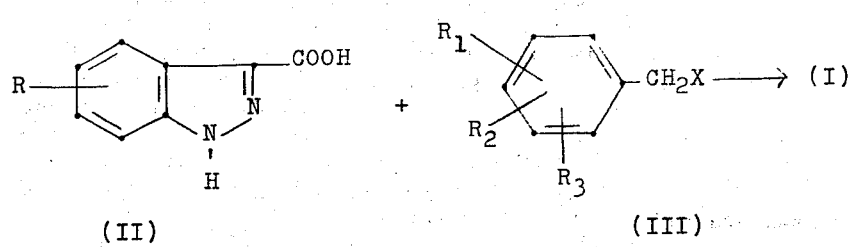

wherein R, $R_1$, $R_2$ and $R_3$ have the above mentioned meanings and X is a halogen or a leaving group of reactivity similar to that of halogens, as for example —O-SO$_2$CH$_3$, —OSO$_2$C$_6$H$_4$CH$_3$, —OC$_6$H$_4$NO$_2$ etc.

The simplest and most useful conditions, in order to have good yields, comprises in heating the acid of Formula (II) with at least three equivalents of dilute aqueous NaOH and little more than one equivalent of the benzyl halide for a period of from 2 to 6 hours. The products (I) are obtained almost pure, and formation of benzyl esters or of isomeric indazole-carboxylic acids substituted in the 2-position is not observed.

The same compounds of Formula (I) can be obtained by reaction between an indazole-3-carboxynitrile or an indazole-3-carboxylic acid ester and the above mentioned benzyl derivatives, followed by alkaline or acid hydrolysis.

Less convenient methods of preparation may also be used. For instance it is possible to first prepare a 1-substituted tetrahydroindazole-carboxylic acid (IV) by benzylation of the known tetrahydroindazole-carboxylic acid and to dehydrogenate the product formed, for example, by heating it or an ester of it with sulphur or palladized carbon in an inert solvent for many hours.

The compounds of Formula (I), wherein $R_4$=NH$_2$ are obtained with the conventional methods from the corresponding acids, esters or nitriles. They can be prepared also starting from indazole-3-carboxamide by reaction with the above mentioned benzyl derivatives (III).

The compounds of Formula (I), wherein $R_4$=OR$_5$, can be obtained from the corresponding acids, acid chlorides or esters, by conventional methods.

EXAMPLE 1

1-p-Chlorobenzyl-1H-indazole-3-carboxylic acid

Eight g. of 1H-indazole-3-carboxylic acid is dissolved in a solution of 8 g. of NaOH in 160 ml. of H$_2$O. While heating in water bath 9.2 g. of p-chlorobenzyl chloride are added with stirring. After heating for three more hours, the solution is cooled and acidified with dilute hydrogen chloride. Crude 1-p-chlorobenzyl-1H-indazole-3-carboxylic acid is precipitated and is recrystallized from acetic acid. The compound has a melting point of 195°C. The yield is 70%. The morpholine salt melts at 176°–178°C.

EXAMPLE 2

1-p-Chlorobenzyl-1H-indazole-3-carboxylic acid

Seventeen g. of 1H-indazole-3-carbonitrile followed by 18.2 g. of p-chlorobenzyl chloride is added to a sodium ethoxide solution prepared from 2.7 g. of sodium

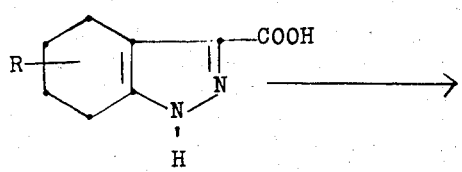

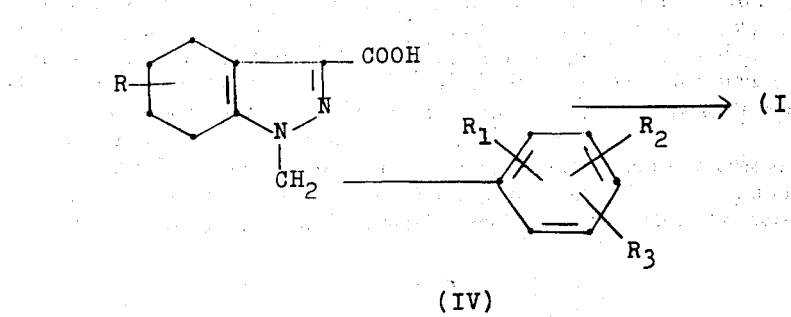

(IV)

and 170 ml. of anhydrous ethanol. The mixture is then refluxed for about 3 hours. Upon completion of the reaction (the pH becomes neutral) the mixture is cooled, the precipitate is separated, dissolved in warm benzene and left to crystallize by adding a small volume of hexane. The product is recrystallized from benzene-hexane and melts at 138°C. The product so formed is 1-p-chlorobenzyl-1H-indazole-3-carbonitrile and 2 g. of this product is added to a solution of 2 g. of NaOH in 13 ml. of $H_2O$, and is heated under stirring for about 24 hours. The mixture is then made acidic, when still warm. The precipitate thus formed is collected, washed with water and recrystallized twice from acetic acid, and 1-p-chlorobenzyl-1H-indazole-3-carboxylic acid is obtained. The yield is almost theoretical.

EXAMPLE 3

Ethyl 1-p-chlorobenzyl- 1H-indazole-3-carboxylate

To 100 ml. of anhydrous xylene at a temperature of about 100°C. is added 1.9 g. of ethyl 1H-indazole-3-carboxylate followed by the addition of 0.5 g. of sodium amide. The mixture is heated with stirring for about 1 hour at 100°-110°C. The temperature is then raised to 120°-130°C. and while vigorously stirring, 3 g. of p-chlorobenzyltosylate in 10 ml. of anhydrous xylene are added dropwise.

The reaction mixture is maintained under stirring and heating at 130°-135°C. for two more hours. Benzene and water are added to the cooled mixture and the phases are separated. The organic layer is once more washed with water and concentrated to dryness. The residue is dissolved in warm ethanol and filtered. The solution is evaporated to dryness and the residue is taken up in a very small volume of warm anhydrous ethanol.

Ethyl 1-p-chlorobenzyl-1H-indazole-3-carboxylate (m.p. 116°C.) crystallizes on cooling.

EXAMPLE 4

α-Glyceryl 1-p-chlorobenzyl-1H-indazole-3-carboxylate

Twelve g. of 1-p-chlorobenzyl-1-H-indazole-3-carboxylic acid are added portionwise to 48 ml. of thionyl chloride, and the mixture is heated at 80°C. for 10 minutes. The solution is concentrated under reduced pressure and the residue is treated with benzene, which is then evaporated in order to eliminate the residual traces of thionyl chloride. 11 G. of 1-p-chlorobenzyl-1H-indazole-3-carbonyl chloride, melting at 165°C., is obtained. This substance is added under stirring and in small portions to a solution of 5 g. of acetone-glycerol in 30 ml. of anhydrous quinoline previously cooled to 0°C.

The mixture is left to stand overnight, at room temperature; water and ether are then added, the ethereal layer is separated, washed with water and dried. The ether is evaporated and the quinoline is removed under vacuum.

The residue is treated with chloroform from which a small amount of 1-p-chlorobenzyl-1H-indazole-3-carboxylic acid separates. The chloroform solution, upon evaporation, leaves a viscous and coloured residue which is dispersed in 25 ml. of $H_2O$ and treated for two hours at 60°C. with 50 mg. of p-toluene-sulphonic acid. The mixture is extracted with ether, which is dried and concentrated to a small volume. A colourless precipitate is formed, which is separated and recyrstallized from benzene. The product melts at 112°C.

EXAMPLE 5

α-Glyceryl-1-o-chlorobenzyl-1H-indazole-3-carboxylate

28 G. of 1-o-chlorobenzyl-1H-indazole-3-carboxylic acid, 21 g. of glycerol, and 21 g. of phenol are refluxed under stirring for 4 hours. The phenol is then removed under vacuum and the residue is taken up with chloroform. The solution is thoroughly washed with water and concentrated to dryness. The residue is dissolved in a small volume of benzene and treated with hexane. The glyceryl ester precipitates and is then triturated in a mortar with a small volume of benzene, to effect crystallinity. It is recrystallized from benzene and melts at 115°C.

EXAMPLE 6

β-Glyceryl-p-chlorobenzyl-1H-indazole-3-carboxylate

A solution of 17 g. of 1-p-chlorobenzyl-1H-indazole-3-carbonyl chloride prepared as in Example 4, in 60 ml. of anhydrous pyridine is added over 15 minutes to a cooled solution of 9.2 g. of 1,3-benzylidene-glycerol in 13 ml. of anhydrous pyridine, under stirring. The mixture is left to stand for 48 hours at room temperature. It is then poured into water and made acidic by means of diluted HCl. The semi-solid precipitate which forms is washed with water and treated with ether in which it dissolves, and from which it then reprecipitates as a crystalline substance. It is filtered and recrystallized from ethanol. The yield is of 20 g. of product melting at 128°C.

Eleven g. of this benzylidene derivative is stirred for 30 minutes at 80°C. with 110 ml. of 50% ethanol and 0.55 ml. of concentrated HCl. The mixture is cooled, and neutralized with a 10% $Na_2CO_3$ solution.

Alcohol and benzaldehyde are eliminated under reduced pressure, leaving an oily residue which is taken up with hot benzene. Part of the solvent is distilled off. On cooling a crystalline solid precipitates. The product melts at 108°C.

EXAMPLE 7

α-Glyceryl-1-(2,4-dichlorobenzyl)-1H-indazole-3-carboxylate 6.5 G. of glyceryl are heated at 100°C.; at which temperature 3.2 g. of 1-(2,4-dichlorobenzyl)-1H-indazole-3-carboxylic acid and one drop of concentrated hydrogen chloride are added under stirring. The temperature is kept for 8 hours at 140°. The reaction mixture is cooled and treated with water and $CH_2Cl_2$. The organic layer is separated, treated with carbon, dried and evaporated. the residue is crystallized from toluene. The compound melts at 137°.

EXAMPLE 8

2-Hydroxy-ethyl-1-p-chlorobenzyl-1H-indazole-3-carboxylate 14.3 G. of 1-p-chlorobenzyl-1H-indazole-3-carboxylic acid are converted into its sodium salt and dispersed in 70 ml. of dimethyl-formamide. The mixture is heated under stirring at 110°C. and 4.5 g. of chloro-ethanol are added dropwise. The mixture is refluxed for 2 hours, cooled, filtered and concentrated to dryness. The residue is taken up with $H_2O$ and ether. The organic layer is separated, thoroughly washed with water and dried. The ether is then evaporated, leaving a residue which solidifies by treatment with hexane and is recrystallized from benzene. The product melts at 75°C. and contains one molecule of crystallization water.

EXAMPLE 9

1-[1-(4-Chloro-naphthyl)-methyl]-1H-indazole-3-carboxylic acid

A solution of sodium ethoxide, prepared from 1.15 g. of Na and 100 ml. of anhydrous ethanol, is added dropwise over 3 hours under stirring to a hot solution of 9.5 g. of ethyl-1H-indazole-3-carboxylate and 10.5 g. of 1-chloro-4-chloromethyl-naphthalene in 150 ml. of ethanol, in such a way that the pH of the reaction mixture never becomes alkaline. The reaction is completed by refluxing for 1 more hour. The mixture is then poured into water and let to stand until the precipitate becomes solid. The precipitate is isolated by filtration and the precipitate is then treated with a small amount of ether and recrystallized from benzene. 8.6 G. of ester melting at 153°C. is obtained. This ester is then added to a solution of 2.8 g. of KOH in 10 ml. of $H_2O$ and 100 ml. of ethanol. The resulting solution is refluxed for 5 hours, following which it is cooled, and made acidic. The precipitate is filtered off, washed and triturated in a mortar with a small amount of ether. It is then recrystallized from acetic acid. 6 G. of product (m.p. 225°C. with decomposition) is obtained.

EXAMPLE 10

Ethyl 1-p-chlorobenzyl-1H-indazole-3-carboxylate

One g. of ethyl 1-p-chlorobenzyl-4,5,6,7-tetrahydro-indazole-3-carboxylate, 13 ml. of decalin and 300 mg. of 10% palladium on carbon are refluxed for 48 hours. The catalyst is filtered and the solvent is evaporated under vacuum. The residue is taken up with ether, washed with diluted NaOH and dried. This solution is passed through an alumina chromatographic column. The first eluate is made up of an ethereal solution of ethyl 1-p-chlorobenzyl-1H-indazole-carboxylate. Yield 50%.

The ethyl 1-p-chlorobenzyl-4,5,6,7-tetrahydro-indazole-3-carboxylate, m.p. 170°, was prepared from ethyl tetrahydro-indazole-3-carboxylate and p-chlorobenzyl chloride by a process corresponding to the procedure of V. Auwers, Ann. 469, 67 for the benzyl analog.

EXAMPLE 11

1-p-Chlorobenzyl-1H-indazole-3-carboxamide

A solution of 12 g. of 1-p-chlorobenzyl-1-H-indazole-3-carbonyl chloride in 15 ml. of chloroform is poured portionwise into 200 ml. of a concentrated ammonia solution. After stirring for a few hours, the solution is extracted with chloroform and the chloroform is separated. The water solution is again extracted with chloroform. The organic layer is dried and evaporated. The solid residue is recrystallized from ethanol. 9 G. of amide, melting at 150°C., is obtained.

EXAMPLE 12

1-p-Chlorobenzyl-1H-indazole-3-carboxamide

4 G. of ethyl 1-p-chlorobenzyl-1H-indazole-3-carboxylate are heated for about 20 hours at 150°–160° in sealed tube with excess of alcoholic ammonia. The cooled solution is filtered, concentrated to a small volume and a precipitate is separated. The alcoholic solution is filtered and then diluted with water. It gives a precipitate formed by 1-p-chlorobenzyl-1H-indazole-3-carboxamide. This substance appears identical to the one prepared according to Example 11.

EXAMPLE 13

1-p-Chlorobenzyl-1H-indazole-3-carboxamide

5 Ml. of hydrogen peroxide solution 30% are added to 1 g. of 1-p-chlorobenzyl-1H-indazole-3-carbonitrile diluted in 10 ml. of ethanol. 25% NaOH is then added till pH 8 is reached. The solution is heated for 90 minutes at 60°, 5 ml. of hydrogen peroxide are further added, heating then for 4 hours at 60°. The solution is cooled, neutralized with 5% $H_2SO_4$ and the precipitate is separated. The precipitate is then washed with water and dried. The substance is identical to the one prepared according to Example 11.

EXAMPLE 14

Ethyl 1-p-chlorobenzyl-1H-indazole-3-carboxylate

A mixture formed by 1 g. of 1-p-chlorobenzyl-1H-indazole-3-carbonitrile, 5 ml. of absolute ethanol and 2.5 ml. of concentrated $H_2SO_4$ is refluxed for 6 hours. The solution is cooled and poured onto ice. The precipitate, which can be recrystallized by a small quantity of absolute alcohol, is separated. It is identical to the product prepared according to Example 3.

EXAMPLE 15

The compounds which are hereinafter listed may also be prepared by the above described methods; more precisely, by a process corresponding to the procedure of Example 1, the following substances can be prepared:
1. 1-o-chlorobenzyl-1H-indazole-3-carboxylic acid, m.p. 220°.
   1-m-chlorobenzyl-1H-indazole-3-carboxylic acid, m.p. 184°.
3. 1p-bromobenzyl-1H-indazole-3-carboxylic acid, m.p. 197°.
4. 1-p-fluorobenzyl-1H-indazole-3-carboxylic acid, m.p. 194°.
5. 1-m-fluorobenzyl-1H-indazole-3-carboxylic acid, m.p. 163°.
6. 1-p-chlorobenzyl-5-methyl-1H-indazole-3-carboxylic acid, m.p. 244°.
7. 1-p-chlorobenzyl-5-methoxy-1H-indazole-3-carboxylic acid, m.p. 212°.
8. 1-p-chlorobenzyl-5-chloro-1H-indazole-3-carboxylic acid, m.p. 210°.
9. 1-(3,4-dichlorobenzyl)-1H-indazole-3-carboxylic acid, m.p. 186°.
10. 1-(2,4-dichlorobenzyl)-1H-indazole-3-carboxylic acid, m.p. 207°.
11. 1-(m-trifluoromethylbenzyl)-1H-indazole-3-carboxylic acid, m.p. 193°.
12. 1-p-methoxybenzyl-1H-indazole-3-carboxylic acid, m.p. 175°.
13. 1-(5-chloro-2-methoxybenzyl)-1H-indazole-3-carboxylic acid, m.p. 222°, dec.
14. 1-(2,6-dichlorobenzyl)-1H-indazole-3-carboxylic acid, m.p. 265°, dec.
15. 7-chloro-1-p-chlorobenzyl1-H-indazole-3-carboxylic acid, m.p. 214°, dec.
16. 1-(2,4-dibromobenzyl)-1H-indazole-3-carboxylic acid, m.p. 228°, dec.
17. 1-(2,4,5-trichlorobenzyl)-1H-indazole-3-carboxylic acid, m.p. 256°, dec.

EXAMPLE 16

The compounds which are listed herebelow are prepared by a process corresponding to the one of Example 9:
18. 1-(4-methylsulphonyl-benzyl)-1-H-indazole-3-carboxylic acid, m.p. 219°.
19. 1-(2,4-dimethyl-benzyl)-1H-indazole-3-carboxylic acid, m.p. 170°, dec.
20. 1-p-methylbenzyl-1H-indazole-3-carboxylic acid, m.p. 195°.
21. 1-(4-chloro-2-methyl-benzyl)-1H-indazole-3-carboxylic acid, m.p. 220°, dec.

EXAMPLE 17

The compounds which are listed herebelow are prepared by a process corresponding to the one of Example 4, that is, by action of a suitable alcohol on the acid chloride:
22. Methyl 1-p-chlorobenzyl-1H-indazole-3-carboxylate, m.p. 161°.
23. p-Chlorobenzyl-1p-chlorobenzyl-1H-indazole-3-carboxylate, m.p. 132°.
24. 2-Dimethylaminoethyl-1-p-chlorobenzyl-1H-indazole-3-carboxylate, m.p. 50°, HCl m.p. 108°.
25. Tetrahydrofurfuryl-1-p-chlorobenzyl-1H-indazole-3-carboxylate, m.p. 115°.
26. α-Glyceryl-1(2,4-dichlorobenzyl)-1H-indazole13-carboxylate, m.p. 137°.
27. Ethyl-1-(2,4-dichlorobenzyl)-1H-indazole-3-carboxylate, m.p. 103°.
28. α-Glyceryl-1-(2,4,5-trichlorobenzyl)-1H-indazole-3-carboxylate, m.p. 123°

We claim:
1. A compound of the formula:

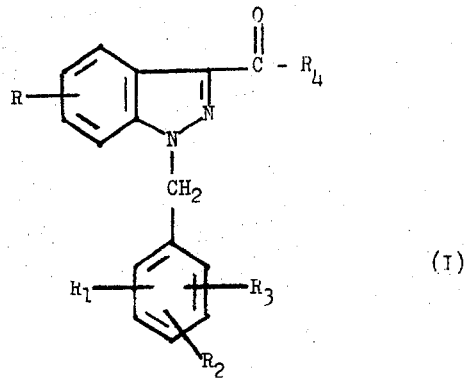

(I)

wherein
R is hydrogen, methyl, methoxy or halogen;
R$_1$ is hydrogen, methyl, halogen or a group forming with the benzene ring to which it is attached a naphthyl ring;
R$_2$ is halogen, methyl, methoxy, trifluoromethyl, —CONH$_2$ or methylsulfonyl;
R$_3$ is hydrogen or halogen;
R$_4$ is hydroxy, —NH$_2$ or —OR$_5$
wherein
R$_5$ is an easily hydrolyzable group —CH$_2$CH$_2$OH, —CH$_2$CHOHCH$_2$OH, or —CH—(CH$_2$OH)$_2$ or pharmaceutically acceptable salt thereof.
2. A compound according to claim 1, which is 1-p-chlorobenzyl-1H-indazole-3-carboxylic acid.
3. A compound according to claim 1, which is α-glyceryl 1-p-chlorobenzyl-1H-indazole-3-carboxylate.
4. A compound according to claim 1, which is β-glyceryl 1-p-chlorobenzyl-1H-indazole-3-carboxylate.
5. A compound according to claim 1, which is 2-hydroxyethyl 1-p-chlorobenzyl-1H-indazole-3-carboxylate.
6. A compound according to claim 1, which is 1-o-chlorobenzyl-1H-indazole-3-carboxylic acid.
7. A compound according to claim 1, which is 1-m-chlorobenzyl-1H-indazole-3-carboxylic acid.
8. A compound according to claim 1, which is 1-p-bromobenzyl-1H-indazole-3-carboxylic acid.
9. A compound according to claim 1, which is 1-(2,4-dichlorobenzyl)-1H-indazole-3-carboxylic acid.
10. A compound according to claim 1, which is α-glyceryl 1(2,4-dichlorobenzyl)-1H-indazole-3-carboxylate.
11. A compound according to claim 1, which is 1-(2,4-dibromobenzyl)-1H-indazole-3-carboxylic acid.
12. A compound according to claim 1, which is 1-(2,4-dimethylbenzyl)-1H-indazole-3-carboxylic acid.
13. A compound according to claim 1, which is 1-(4-chloro-2-methylbenzyl)-1H-indazole-3-carboxylic acid.

* * * * *